(12) United States Patent
Shimizu et al.

(10) Patent No.: US 7,958,508 B2
(45) Date of Patent: Jun. 7, 2011

(54) METHOD OF POWER-AWARE JOB MANAGEMENT AND COMPUTER SYSTEM

(75) Inventors: Masaaki Shimizu, Mitaka (JP); Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 12/068,086

(22) Filed: Feb. 1, 2008

(65) Prior Publication Data
US 2008/0222434 A1 Sep. 11, 2008

(30) Foreign Application Priority Data
Mar. 9, 2007 (JP) .................. 2007-060091

(51) Int. Cl.
G06F 9/46 (2006.01)
G06F 1/00 (2006.01)

(52) U.S. Cl. ........................ 718/102; 713/330

(58) Field of Classification Search .......... 713/300–340; 718/102–103
See application file for complete search history.

(56) References Cited

U.S. PATENT DOCUMENTS

| | | | | |
|---|---|---|---|---|
| 5,404,541 A * | 4/1995 | Hirosawa et al. | ............. | 713/324 |
| 5,461,266 A * | 10/1995 | Koreeda et al. | ............. | 307/125 |
| 6,065,123 A * | 5/2000 | Chou et al. | ................ | 713/322 |
| 6,834,354 B1 * | 12/2004 | Togawa | .................... | 713/320 |
| 7,100,062 B2 * | 8/2006 | Nicholas | .................. | 713/323 |
| 7,111,182 B2 * | 9/2006 | Gary | ......................... | 713/324 |
| 7,401,240 B2 * | 7/2008 | Heller et al. | ................. | 713/320 |
| 7,464,279 B2 * | 12/2008 | Motoyama | ................ | 713/320 |
| 7,472,298 B1 * | 12/2008 | Kimmel et al. | .............. | 713/320 |
| 7,770,176 B2 * | 8/2010 | Maeda et al. | ................ | 718/105 |
| 2003/0074592 A1 * | 4/2003 | Hasegawa | .................. | 713/324 |
| 2005/0125700 A1 * | 6/2005 | Chang et al. | ................ | 713/300 |
| 2006/0184780 A1 | 8/2006 | Yamada et al. | | |
| 2009/0235104 A1 * | 9/2009 | Fung | ......................... | 713/324 |

FOREIGN PATENT DOCUMENTS

| | | |
|---|---|---|
| JP | 06-044095 | 7/1992 |
| JP | 07-141305 | 11/1993 |
| JP | 09-091254 | 9/1995 |
| JP | 2003-162515 | 11/2001 |
| JP | 2005-234637 | 2/2004 |
| WO | WO 2004/092934 A1 | 4/2004 |

OTHER PUBLICATIONS

Office Action from the Japanese Patent Office dated Jan. 27, 2009.
Decision of Refusal from Japanese Patent Office dated Apr. 17, 2009.
Windows NT World 8, in Japanese, Copywrite 1999.

* cited by examiner

*Primary Examiner* — Paul R Myers
(74) *Attorney, Agent, or Firm* — Stites & Harbison PLLC; Juan Carlos A. Marquez, Esq.

(57) ABSTRACT

Provided is a method used in a computer system which includes at least one host computer, the method including managing a job to be executed by the host computer and a power supply of the host computer, the method including the procedures of: receiving the job; storing the received job; scheduling an execution plan for the stored job; determining, based on the execution plan of the job, a timing to execute power control of the host computer; determining a host computer to execute the power control when the determined timing to execute the power control is reached; controlling the power supply of the determined host computer; and executing the scheduled job.

15 Claims, 8 Drawing Sheets

150 — NODE INFORMATION MANAGEMENT TABLE

| NODE NUMBER | STARTUP/ TERMINATION TIME | LOW POWER CONSUMPTION MODE |
|---|---|---|
| 1 | 10 MINUTES / 3 MINUTES | AVAILABLE |
| ... | ... | ... |
| n | 5 MINUTES / 5 MINUTES | UNAVAILABLE |

160 — NODE POWER STATUS TABLE

| NODE NUMBER | POWER STATUS | POWER MODE |
|---|---|---|
| 1 | ON | 2 GHz |
| ... | ... | ... |
| n | OFF | - |

```
#/bin/csh
#@$ -q        default
#@$ -N        4
#@$ -l        time_limit =10:00:00
#@$ -l        time_pred =00:60:00
#@$ -l        cpu_perf=2GHz
#@$ -l        need_mem =4GB
#@$ -l        need_io=4
#@$ -l        need_vector_unit =4
mpirun $nodefile ./ test_program
```

*FIG. 5*

[ EXAMPLE OF LOWER POWER CONSUMPTION EFFECT (1 HOST 300 W) ]

|  | POWER CONSUMPTION (kwh) | CALCULATION FORMULA |
|---|---|---|
| WITH POWER MANAGEMENT | 4.8 kwh | 300 × (1/6) × 6 × 2 × 8 |
| WITHOUT POWER MANAGEMENT | 3.6 kwh | 300 × (1/6) × 72 |

*FIG. 9*

METHOD OF POWER-AWARE JOB MANAGEMENT AND COMPUTER SYSTEM

CLAIM OF PRIORITY

The present application claims priority from Japanese application P2007-60091 filed on Mar. 9, 2007, the content of which is hereby incorporated by reference into this application.

BACKGROUND OF THE INVENTION

This invention relates to a method of managing power of a computer system which includes a plurality of computers, and more specifically, to a method of managing power in a computer system such as a super computer, which includes a large number of computers.

There has been known a technology of constructing a computer system which includes several hundreds to several thousands of nodes (computers) including a processor, which are coupled via a high-speed network. The computer system has been implemented as a cluster computer, a massively parallel computer, or a super computer.

In a computer system which includes several hundreds or several thousands of nodes as described above (parallel computer or cluster computer), power consumption per unit time of the computer system as a whole increases to an enormous amount even when power consumption of each node is several hundred W/h, and therefore it is costly to maintain a large-scale computer in terms of power charge.

Meanwhile, the above-mentioned large-scale computer is not always performing jobs on all the nodes for 24 hours a day, every day in every year. For example, there may be a case where a usage rate of the nodes, which is 100% during the daytime, drops to about 30% during the nighttime, or the usage rate of the nodes even during the daytime may further drop during the summer vacation. It is rare that a system constantly operates at the usage rate of 100% even in the case of a computer system with high usage rate. An average of the usage rate in a typical computer system is from 70% to 90%.

In a computer (node) that is executing no job, a processor or the like is brought to an idle state. There has been known a cluster computer, in which, when the idle state is detected in a processor of its own node, a predetermined command is issued to change the idle state to a suspended state (halting state), to thereby suppress wasteful power consumption (see, for example, JP 2003-162515 A).

SUMMARY OF THE INVENTION

However, according to the above-mentioned conventional technology, in order to reuse the node which has been once shifted to a non-operating state including the suspended state, it is necessary to energize each unit of the node before activating an OS, and the node can be used only after the activation of the OS is completed. Accordingly, it is necessary to wait for a while to be able to reuse the node which has been shifted to a low power consumption mode.

On the other hand, in a case of a parallel computer such as a super computer, a job is allocated to a plurality of nodes to be executed. When a certain job is completed, a next job is allocated to the plurality of nodes. In a case where, for example, a job is currently being executed on 70 nodes while 30 nodes are on standby in the suspended state in the parallel computer system as described above, to which the above-mentioned conventional technology is applied, it is necessary to activate the 30 nodes which are currently in the suspended state, after the current job is completed, when 100 nodes are necessary to execute a next job. In this case, it takes time to activate the 30 nodes which have been in the suspended state so as to make those nodes available for receiving the next job. Accordingly, the 70 nodes which have been completed the preceding job need to wait until the 30 nodes in the suspended state to be activated, and there has been a problem that the 70 nodes wastefully consume power until the activation of the 30 nodes is completed and the completion time of the next job is delayed by the time necessary to activate the 30 nodes.

In view of the above-mentioned circumstances, this invention has been made, and therefore, it is an object of the invention to provide a computer system which includes a plurality of nodes, in which power consumption of the computer system as a whole is suppressed by shifting the nodes to a suspended state while reducing a waiting time necessary for making the nodes in the suspended state available for use, to thereby achieve higher performance of the entire computer system.

This invention relates to, in a computer system which includes at least one host computer, a method of managing a job to be executed by the at least one host computer and a power supply of the at least one host computer, the method including the procedures of: receiving the job; storing the received job; scheduling an execution plan for the stored job; determining, based on the execution plan of the job, a timing to execute power control of the host computer; determining a host computer to execute the power control when the determined timing to execute the power control is reached; controlling the power supply of the determined host computer; and executing the scheduled job.

Therefore, according to this invention, it is possible to suppress power consumption of the computer system as a whole by shifting the host computer to the suspended state while reducing a waiting time until the host computer in the suspended state is made available for use, to thereby achieve higher performance of the entire computer system.

BRIEF DESCRIPTION OF THE DRAWINGS

FIG. 3 is an explanatory diagram illustrating an example of a node information management table held by a job scheduler.

FIG. 4 is an explanatory diagram illustrating an example of a node power status table held by the job scheduler.

FIG. 5 is an explanatory diagram illustrating an example in which an example of a job handled by the job scheduler is expressed in a job description language.

FIG. 9 is an explanatory diagram illustrating a result of the power management.

DETAILED DESCRIPTION OF THE PREFERRED EMBODIMENT

Hereinbelow, an embodiment of this invention will be described with reference to the accompanying drawings.

Figure 1:
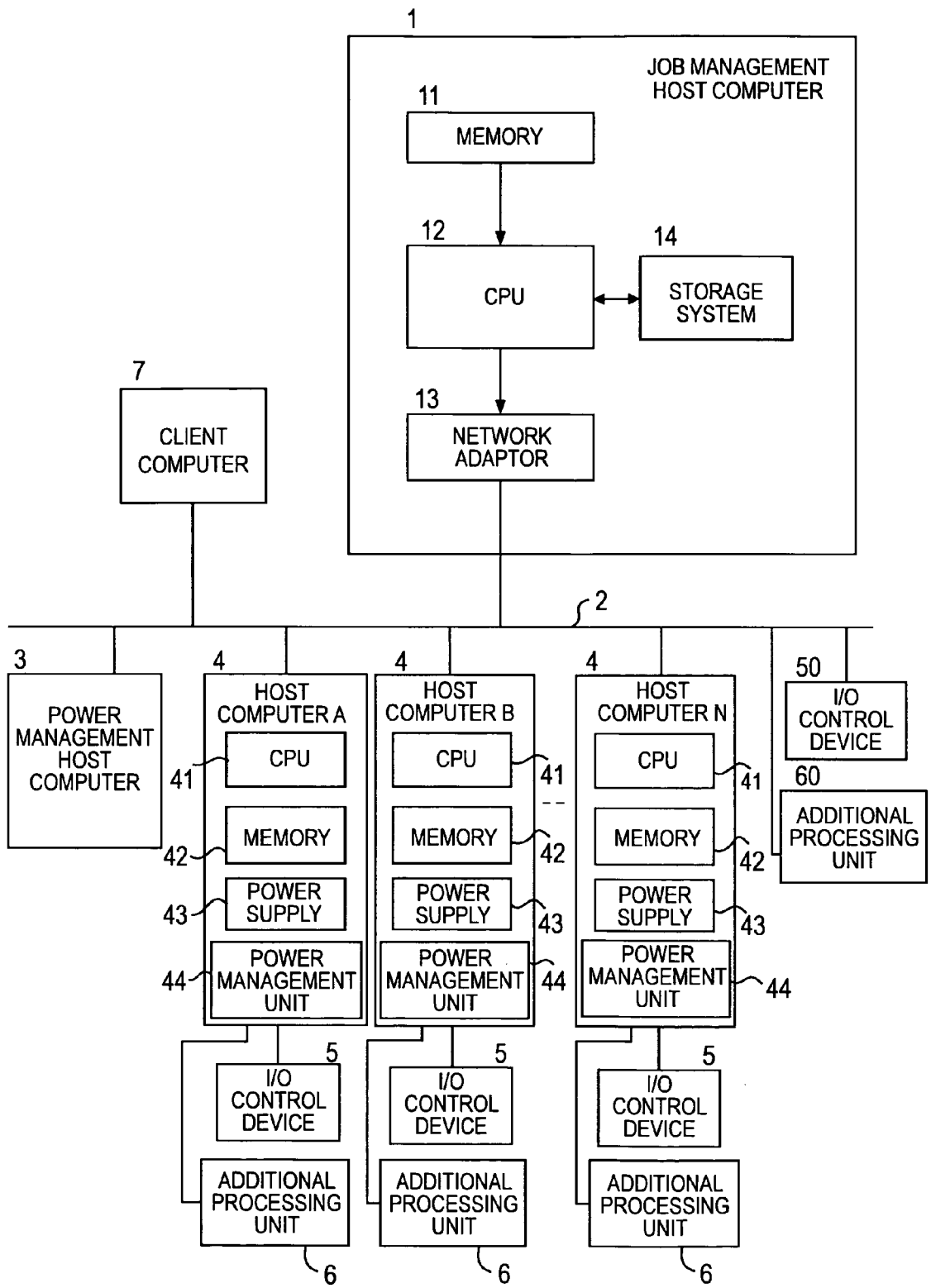
FIG. 1 is a block diagram illustrating a configuration of a computer system to which this invention is applied.

FIG. 1 is a block diagram illustrating a configuration of a computer system to which this invention is applied. The computer system of FIG. 1 is implemented, by way of example, as a parallel computer, in which a plurality of host computers 4 are coupled to a network 2, one of the plurality of host computers 4 functions as a job management host computer 1, another one of the host computers 4 functions as a power management host computer 3 for performing power management, and the rest of the host computers 4 execute a job.

The job management host computer (management computer) 1 executes a job scheduler for allocating a job (or task) to the plurality of host computers 4 to execute the job, and the power management host computer 3 controls a power supply state of each of the plurality of host computers 4. The host computers 4 for executing the job are provided as host computers A to n in the drawing, and each constitute a node. The number of the host computers is n.

The job management host computer 1 receives a job execution request from a client computer 7, and executes the job scheduler for allocating the job to the plurality of host computers 4. Also, the job scheduler of the job management host computer 1 designates, with respect to the power management host computer 3, the power supply state for each of the host computers 4 based on the scheduling of the job.

First, the job management host computer 1 includes a CPU (processor) 12 for performing arithmetic processing, a memory 11 for storing data and a program, a storage system 14 for storing a program or data, and a network adaptor 13 for transmitting and receiving data between the network 2.

The host computers 4 for executing the job each include a CPU 41 for performing arithmetic processing, a memory 42 for storing data and a program, a power supply 43 for supplying power to hardware resources such as the CPU 41 and the memory 42, a power management unit 44 for controlling the power supply 43, an I/O control device 5, and an additional processing unit 6. The I/O control device 5 includes, for example, a storage system, which is supplied with power from the power supply 43. Also, the additional processing unit 6 includes an accelerator or the like for executing specific arithmetic processing such as a vector operation, and is supplied with power from the power supply 43. The I/O device and the additional processing unit may be coupled to the network 2, as in the case of the I/O device 50 and the additional processing unit 60 of FIG. 1, to be shared by the host computers 4.

In the system, the power management unit 44 of each of the host computers 4 is capable of changing the power supply state with respect to the hardware resources according to the designation from the power management host computer 3. For example, the power management unit 44 shuts off power to the hardware resources, supplies power to the hardware resources in part, or supplies power to all the hardware resources, to thereby control the power supply state.

It should be noted that the power supply state in which power is supplied to the hardware resources in part includes, for example, a case where the CPU 41 is suspended while only a predetermined rank of the memory 42 is supplied with power to thereby shift the host computer 4 to a suspended state, and a suspended state where power to the CPU 41, the I/O control device 5, and the additional processing unit 6 is shut off while the memory 42 is supplied with power. In addition to the above-mentioned cases, the power supply state in which power is supplied to the hardware resources in part further includes an operating state in which power is supplied to the CPU 41 and to a predetermined rank of the memory 42 to execute a job, and another operating state in which power is supplied to at least one of the I/O control device 5 and the additional processing unit 6, which is needed for executing an allocated job, and to the CPU 41 and the memory 42 to execute the job. In other words, the power management unit 44 of each of the host computers 4 supplies power in part to the hardware resources of the host computer 4, to thereby set the operating state or the suspended state thereto. Further, in the following, when power is supplied to the hardware resources in part, a state where the CPU 41 and at least part of the memory 42 are supplied with power is referred to as the operating state of the host computer 4, and a case where the CPU 41 is suspended is referred to as the suspended state of the host computer 4.

Further, the CPU 41 is provided with a low power consumption mode in which an operating frequency and an operating voltage are dynamically changed, and is capable of switching between the low power consumption mode and a normal operation mode (in which the CPU 41 operates at a predetermined operating frequency and operating voltage) according to a designation from an OS.

The power management host computer 3 designates, with respect to the power management unit 4 of the host computer 4, one of the operating state and the suspended state described above. Further, in a case of designating the operating state to the host computer 4, the power management host computer 3 is also capable of designating the low power consumption mode.

Figure 2:
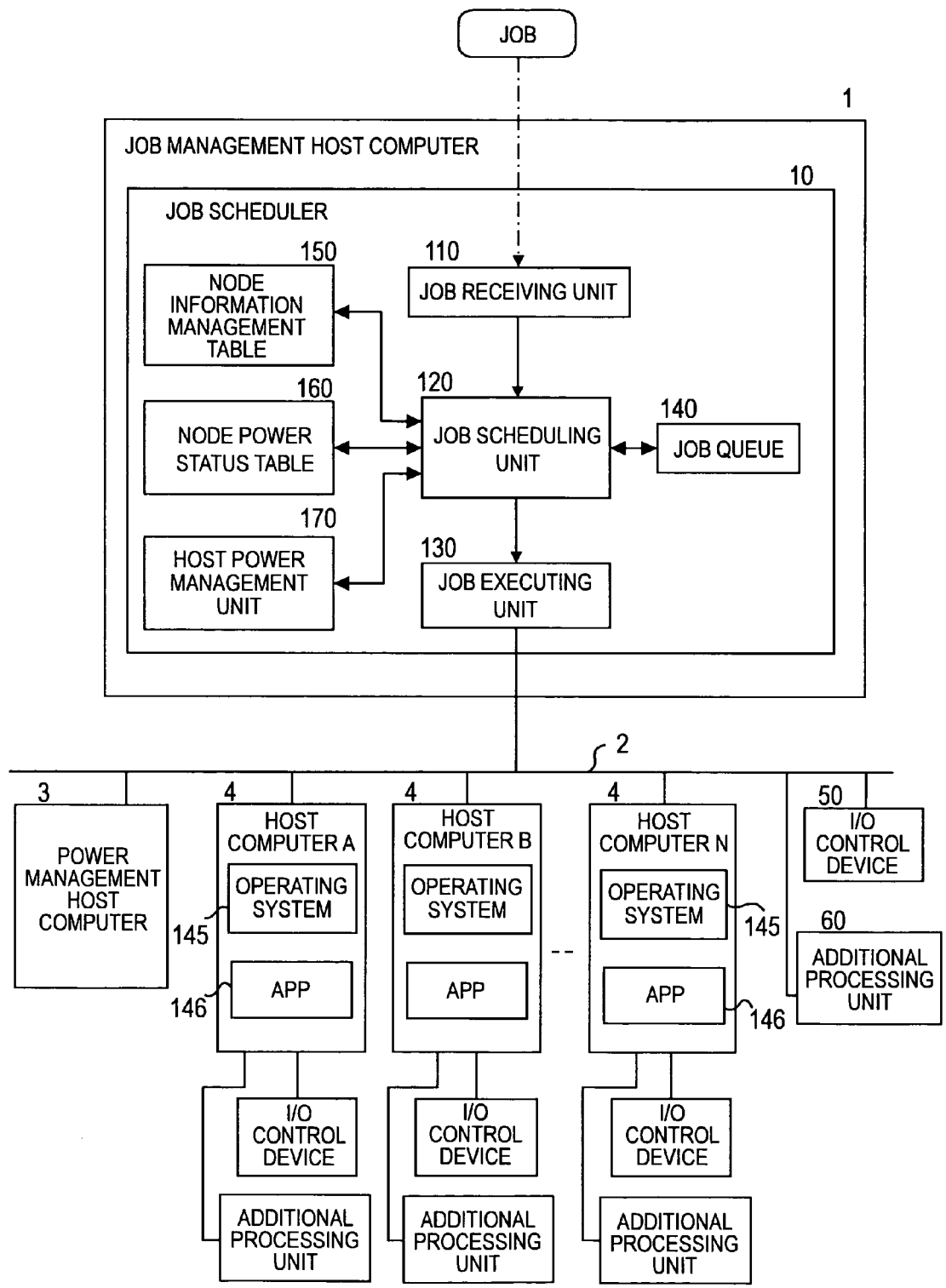
FIG. 2 is a block diagram illustrating a software configuration of the computer system shown in FIG. 1.

FIG. 2 is a block diagram illustrating a software configuration of the computer system shown in FIG. 1.

On the job management host computer 1, a job scheduler 10 for managing a job to be allocated to the plurality of host computers 4 is executed by the CPU 11. The job scheduler 10 receives, through a job receiving unit 110, a job execution request from the client computer 7. The received job is temporarily stored in a job queue 140 by the job scheduling unit 120.

The job scheduling unit 120 determines, as to the job held in the job queue 140, an order of priority or the like, sets an execution sequence (execution plan) for a plurality of jobs, to thereby perform scheduling.

The job scheduling unit 120 transmits the job, based on the schedule (execution plan), to a job executing unit 130, and the job executing unit 130 transmits the job received from the job scheduling unit 120 to a predetermined one of the hosts A to n, to thereby execute the job.

The job scheduling unit 120 sets, with reference to the job queue 140, priorities of the jobs to be executed, and determines the host computers 4 to allocate each of the jobs. In order to allocate jobs to the host computers 4, a known method such as a network queuing system (NQS) may be adopted, and therefore a detailed description thereof will be omitted in the following.

The job scheduling unit 120 schedules the activation of a host power management unit 170, based on a scheduled completion time of a job to be executed next and on a node information management table 150. As will be described later, the job scheduling unit 120 schedules in advance the activation of the host power management unit 170 with consideration given to an activation time of each of the host computers 4, such that host power management unit 170 is activated before the activation time. In a case where the plurality of host computers 4 have different activation times, the job scheduling unit 120 sets the activation time of the host power management unit 170 according to the longest one of the activation times of the host computers 4.

Further, the job scheduling unit 120 refers to the number of nodes (number of host computers 4) necessary for the next job and also refers to a node power status table 160, to thereby determine whether there is any host computer 4 that is unnecessary for executing the next job. In a case where there is an unnecessary host computer 4, the job scheduling unit 120 instructs the power management host computer 3 to shift the corresponding host computer 4 to the suspended state.

The host power management unit 170 is activated based on the scheduled set by the job scheduling unit 120, reads a next job from the job queue 140, and obtains the number of nodes to be required by the next job. Then, the host power management unit 170 obtains, from the node power status table 160, the number of nodes which are currently in the operating state, and in a case where the number of nodes to be required by the next job is larger than the number of nodes which are currently in the operating state, selects a host computer 4 to be newly activated, and instructs the activation thereof in advance before the next job is started. In other words, the host power management unit 170 instructs the power management host computer 3 to activate the host computer 4 which is to be newly required, at a time point prior to the scheduled completion time of the current job. The time point is determined by subtracting the activation time of the host computer 4 from the scheduled completion time of the current job.

The power management host computer 3 designates the power supply state, with respect to the power management unit 44 of each of the host computers 4, based on the power supply state of each of the host computers 4 received from the job management host computer 1. The power management unit 44 of each of the host computers 4 sets the power supply state of the host computer 4 to any one of the operating state and the suspended state, based on the designation from the power management host computer 3.

The host computers 4 each include an OS 145 which is executed by the CPU 41, and execute a job allocated by the job scheduler 10 on the OS 145. The allocated job has an application designated thereto. Each of the host computers 4 reads the application included in the allocated job, from the I/O control device 5 or the like, and executes the application. The OS 145 issues a predetermined command to the CPU 41 when the low power consumption mode is designated by the power management unit 44, to thereby cause the CPU 41 to be executed in the low power consumption mode.

FIG. 3 is an explanatory diagram illustrating an example of the node information management table 150 held by the job scheduler 10. The node information management table 150 includes a node number 151 assigned to each of the host computers 4, a startup/termination time 152 for storing a startup time required for activating the corresponding host computer 4 from a power off state to an activated state where execution of a job is possible and a termination time required for shutting off the power from the activated state, and a low power consumption mode 153 for storing whether the low power consumption mode is available or not to the CPU 41 of the host computer 4. For example, in a case of a host computer 4 which has the node number 151=1, the startup/termination time 152 stores 10 minutes/3 minutes, which indicates that it takes 10 minutes to activate the host computer 4 and 3 minutes to terminate (shut off the power to) the host computer 4. The low power consumption mode 153 of the host computer 4 having the node number 151=1 stores "available", which indicates that the host computer 4 has the CPU 41 provided with the low power consumption mode. The job management host computer 1 updates the node information management table 150 when any of the host computers 4 is updated.

FIG. 4 is an explanatory diagram illustrating an example of the node power status table 160 held by the job scheduler 10. The node power status table 160 includes a node number 161 assigned to each of the host computers 4, a power status 162 for indicating whether the corresponding host computer 4 is in the operating state or in the halting state, and a power mode 163 indicating a power consumption status of the host computer 4 (for example, the operating frequency of the CPU 41). For example, in a case of a host computer 4 having the node number 161=1, the power status 162 is indicated as "ON", which indicates that the host computer 4 is in the operating state, and the power mode 163 indicates that the CPU 41 of the host computer 4 is operating at 2 GHz.

The node power status table 160 is obtained by the job scheduler 10 from each of the host computers 4 at predetermined intervals (for example, several minutes), and is used by the job scheduler 10 to update obtained values.

FIG. 5 is an explanatory diagram illustrating an example in which an example of a job handled by the job scheduler 10 is expressed in a job description language.

In the job as expressed in FIG. 5, "#@$–N 4" indicates the number of nodes necessary for the job, "time_limit=10:00:00" indicates that a maximum execution time of the job is 10 hours, and "time_pred=00:60:00" indicates that the scheduled completion time of the job is 60 minutes. The maximum execution time indicates that the job is not allowed to exclusively use the host computer 4 over the maximum execution time. When the maximum execution time is exceeded, the host computer 4 stops executing the job.

Further, "cpu_perf=2 GHz" indicates that it is sufficient that the CPU 41 operates at the operation frequency of at least 2 GHz, "need_mem=4 GB" indicates that 4 GB of the memory 42 contained in the host computer 4 is used, "need_io=4" indicates that the number of the I/O control devices 5 required for the corresponding job is 4, and "need_vector_unit=4" indicates that the number of the additional processing units 6 required by the job is 4. In other words, it is indicated that the power management unit 44 of the host computer 4 is allowed to shut off power supply to any unnecessary hardware resource, as long as the above-mentioned condition is satisfied. In the drawing, "mpirun$nodefile./test_program" indicates a path of an application to be executed.

When the job shown in FIG. 5 is stored in the job queue 140 and is allowed to be executed, the job scheduling unit 120 reads the job of FIG. 5, allocates the job to the necessary number of host computers 4 to execute the job.

Figure 6:
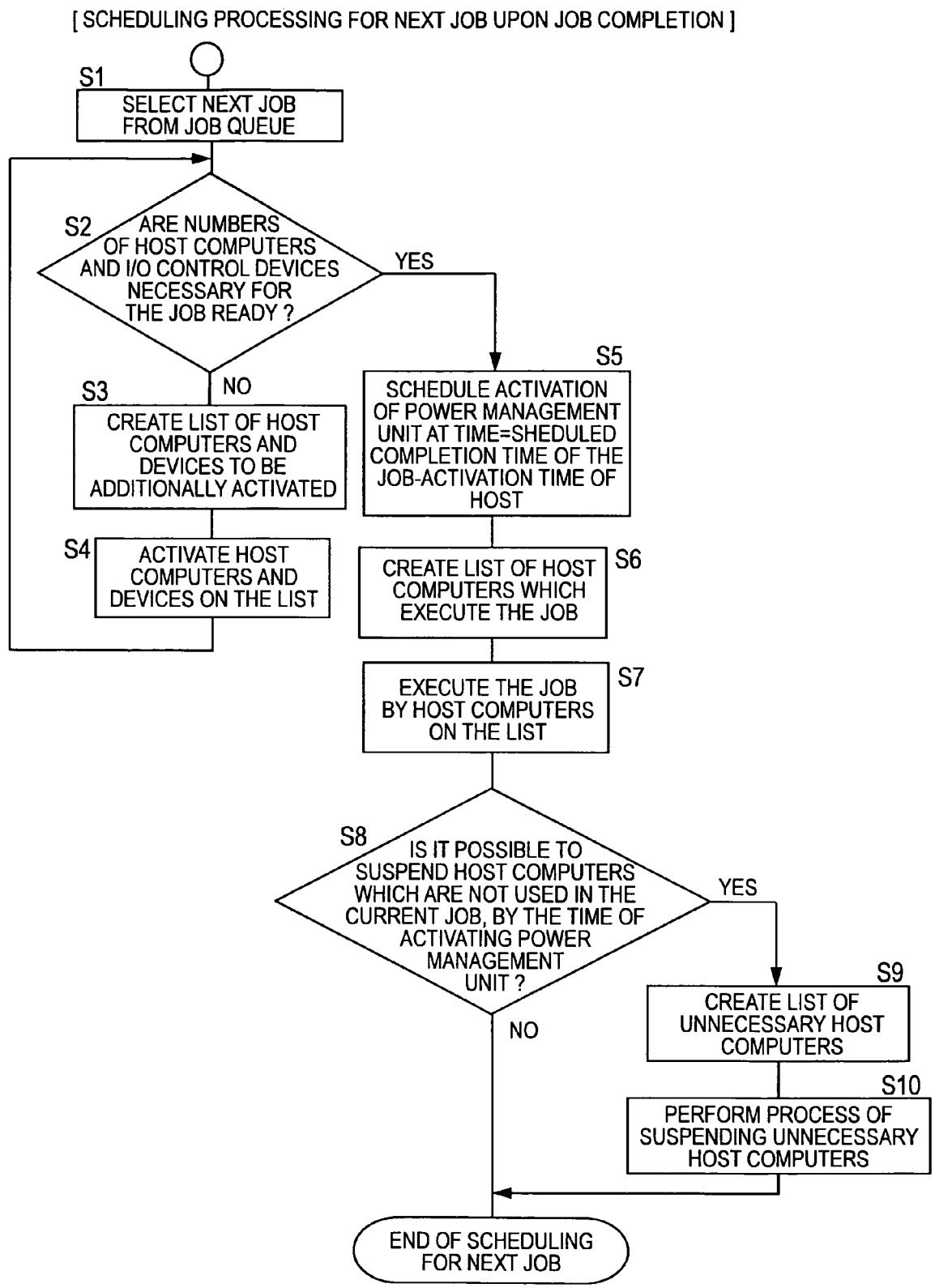
FIG. 6 is a flowchart illustrating an example of a process executed by a job scheduling unit.

FIG. 6 is a flowchart for illustrating an example of a process executed by the job scheduling unit 120. The process is executed when the job, which is currently being executed, is completed. The job scheduling unit 120 determines whether the job is completed, based on a notification from the host computers 4 to which the job is allocated.

When the job, which is currently being executed, is completed, the job scheduling unit 120 reads another job to be executed next from the job queue 14, and obtains the number of nodes necessary for the job (S1). Next, the job scheduling unit 120 determines whether it is possible to secure the numbers of the nodes and the I/O control devices 5 (or additional processing units 6) necessary for the next job (S2). When it is impossible to secure the numbers, the process proceeds to S3, where the job scheduling unit 120 selects host computers 4 to be newly activated, based on a differential between the numbers of nodes and I/O control devices 5 (number of additional processing units 6, hereinafter the same) necessary for the next job and the numbers of currently available nodes and I/O control devices 5. In order to make the selection, the job scheduling unit 120 refers to the node power status table 160, and selects the necessary number of host computers 4 which are currently in the suspended state, as activation targets. Then, the job scheduling unit 120 creates a list of activation targets which include the host computers 4 and the I/O control devices 5 thus selected. The node power status table 160 of FIG. 4 merely shows the power status 162 of the host computer 4, but the job scheduler 10 holds, although not shown, a table indicating the power statuses of the I/O control device 5 and the additional processing unit 6 for each node number 161 of each host computer 4.

Next, in S4, the power management host computer 3 is instructed to activate the host computers 4 and the I/O control devices 5 (or additional processing units 6), which are additionally included in the list of activation targets created in S3 as described above. In response to the instruction, the power management host computer 3 issues an instruction with respect to the host computers 4 to be newly activated so as to shift to the operating state, and the host computers 4 and the I/O control devices 5 as the activation targets start being activated.

When all the host computers 4 corresponding to the number of nodes required by the job to be executed next are activated in S2, the process proceeds to S5. In S5, the scheduled completion time of the job, which is started to be executed, is read from the description of the job shown in FIG. 5, and sets a time obtained by subtracting the activation time of the host computers 4 from the scheduled completion time of the job, as a time at which the host power management unit 170 is activated.

In S6, the job scheduling unit 120 creates a list of the host computers 4 which execute the next job, and instructs, in S7, the host computers 4 included in the list to execute the job.

Next, in and after S8, the job scheduling unit 120 executes suspending processing with respect to the host computers 4 which are unnecessary this time.

In S8, as to each of the host computers 4 which are not used for executing the current job, it is determined whether the host computer 4 can be suspended by the scheduled activation time of the host power management unit 170. When there is any host computer 4 that can be suspended, the process proceeds to S9, where the host computer 4, which is not currently executing a job and in the operating state, is added to the list of unnecessary host computers 4. In S10, the power management host computer 3 is instructed to suspend the host computers 4 included in the list of unnecessary host computers 4. Through the above-mentioned processing, the host computers 4 which are not executing the job are shifted to the suspended state.

On the other hand, when the result of determination in S8 is "NO", a host computer 4, which has once been suspended, is to be immediately reactivated, for example, in a case where the current job, which has just been started to be executed but is not executed by the host computer 4, will be completed in a short period of time. In this case, when the amount of reduction in power consumption due to the suspension of the host computer 4 for a short period of time is compared with the amount of increase in power consumption due to the activation of the host computer 4, the activation of the host computer 4 consumes larger power than the normal operation thereof, because of the needs to charge a capacitor and to spin up a drive or a fan in the activation. In this case, the power consumption of the entire computer system can further be reduced by maintaining the operating state of the host computer 4 rather than suspending the host computer 4, and therefore the host computer 4 that is not executing the job is prohibited from being shifted to the suspended state. At this time, as regards the host computer 4 that is not executing the job, the job scheduling unit 120 instructs the power management host computer 3 to shift the host computer 4 to the low power consumption mode. It should be noted, however, that the job scheduling unit 120, when giving the instruction, refers to the node information management table 150, and gives the instruction only to the host computer 4 which includes the CPU 41 provided with the low power consumption mode, to shift to the low power consumption mode. The relation between the power consumption necessary for the activation of the host computer 4 and the power consumption in a case where the host computer 4 is not suspended is set in advance, and the host computer 4 is prohibited from being shifted to the suspended state in a case where, for example, the host computer 4 is to be suspended for less than a predetermined period of time (for example, 13 minutes).

Through the above-mentioned processing, it is scheduled such that the host computers 4 necessary for executing the job are activated to start executing the new job, and the host power management unit 170 is activated at a time determined by subtracting the activation time of the host computers 4 from the scheduled completion time of the job. Further, the job is preferentially allocated to the host computers 4 which have already been activated, which prevents the suspension and the activation of host computers 4 from occurring at the same time.

Figure 7:
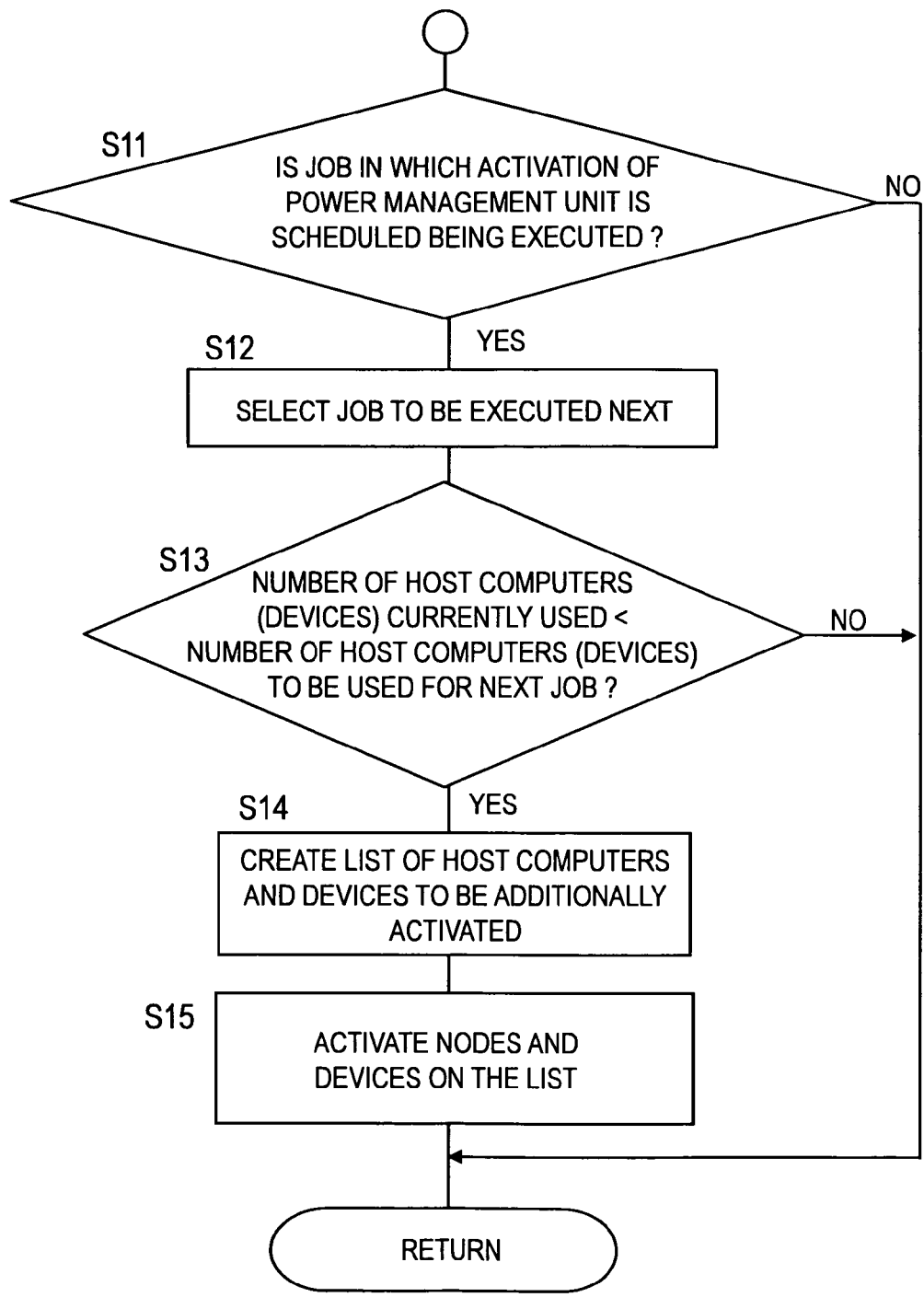
FIG. 7 is a flowchart illustrating an example of a process executed by a host power management unit which is activated at a time scheduled by the job scheduling unit.

FIG. 7 is a flowchart for illustrating an example of a process executed by the host power management unit 170 which is activated at a time scheduled by the job scheduling unit 120.

The host power management unit 170 is activated at a time scheduled by the job scheduling unit 120. In other words, the host power management unit 170 is activated at a time=the scheduled completion time of the job currently executed−the activation time of the host computer 4. First, the host power management unit 170 determines whether the activation of the host power management unit 170 is scheduled in the job currently executed. The determination is made by, for example, adding an identifier of a job to the schedule of the host power management unit 170 and the identifier is compared with the identifier of the job currently executed.

In other words, in a case where the job currently executed does not have the activation of the host power management unit 170 scheduled therein, it is unnecessary to perform power control for a next job. Accordingly, it is confirmed whether the job in which the above-mentioned activation is scheduled is normally executed or not. In a case where the job currently executed coincides with the job in which the activation of the host power management unit 170 is scheduled, the power control for the next job is performed in and after S12. On the other hand, in a case where the job currently executed does not correspond to the job which has the activation of the host power management unit 170 scheduled therein, the process is ended. In other words, in a case where the job in which the activation of the host power management unit 170 is scheduled is abnormally completed due to an error or the like, the job scheduling unit 120 introduces another job, which eliminates the need for the activation of the host power management unit 170.

Next, the host power management unit 170 selects, from the job queue 140, a job to be executed next to the job currently executed. In selecting the next job, for example, a job assigned a highest priority is selected from jobs which are waiting to be executed in the job queue 140. Then, the host power management unit 170 determines whether the number of nodes to be used for the selected job is larger than the number of nodes which are used for the job currently executed. In other words, in a case where the number of nodes to be used for the job to be executed next to the job currently executed is larger than the current number of nodes, it is necessary to newly activate host computers 4 which are now in the suspended state, and therefore the process proceeds to S14. In a case where the number of nodes used for the job currently executed is sufficient enough to execute the next job, the process is immediately ended.

In S14, the host power management unit 170 selects, with reference to the host power status table 160, the required number of the host computers 4 which are in the suspended state (power status 162=OFF), and creates a list of the host computers 4 to be activated. Then, in S15, based on the list of the host computers 4 to be activated, the host power management unit 170 designates host computers 4 to be additionally activated, and instructs the power management host computer 3 to activate the designated host computers 4.

Based on the instruction from the host power management unit 170, the power management host computer 3 instructs activation with respect to the power management units 44 of the designated host computers 4 so as to cause the power management units 44 to activate the designated host computers 4.

In other words, the host power management unit 170 is capable of instructing activation to the host computers 4 which are to be additionally activated, at a time obtained by subtracting the activation time of the host computers 4 from the scheduled completion time of the job currently executed. Accordingly, upon starting the next job, the host computers 4 corresponding to the necessary number of nodes have already been activated and therefore it is possible to immediately execute the job.

In the above-mentioned processes in S13 to S15, the additional activation process is performed based on the relation between the number of nodes and the host computers 4. However, it is also possible, as to the I/O control device 5 and the additional processing unit 6, to similarly select the devices (I/O control devices or additional processing units 6) to be additionally activated, to thereby perform power control.

In other words, the host power management unit 170 determines whether or not the number of devices (I/O control devices 5 or additional processing units 6) to be used for the selected job is larger than the number of devices used in the job currently executed. In a case where the number of devices to be used for the job to be executed next is larger than the number of devices used in the job currently executed, the number of devices corresponding to a differential between the numbers of the devices is selected from the host power status table 160, and instructs activation of the devices to the power management host computer 3.

Through the above-mentioned processing, it is possible to activate, by the time the next job is started, the host computers 4, the I/O control devices, or the additional processing units 6, which have once been suspended.

Accordingly, in the computer system including the plurality of host computers 4, it is possible to suppress power consumption of the computer system as a whole by shifting the host computers 4 to the suspended state while reducing a waiting time necessary for making the host computers 4, which have once been shifted to the suspended state, available for use, to thereby achieve higher performance of the entire computer system.

Figure 8:
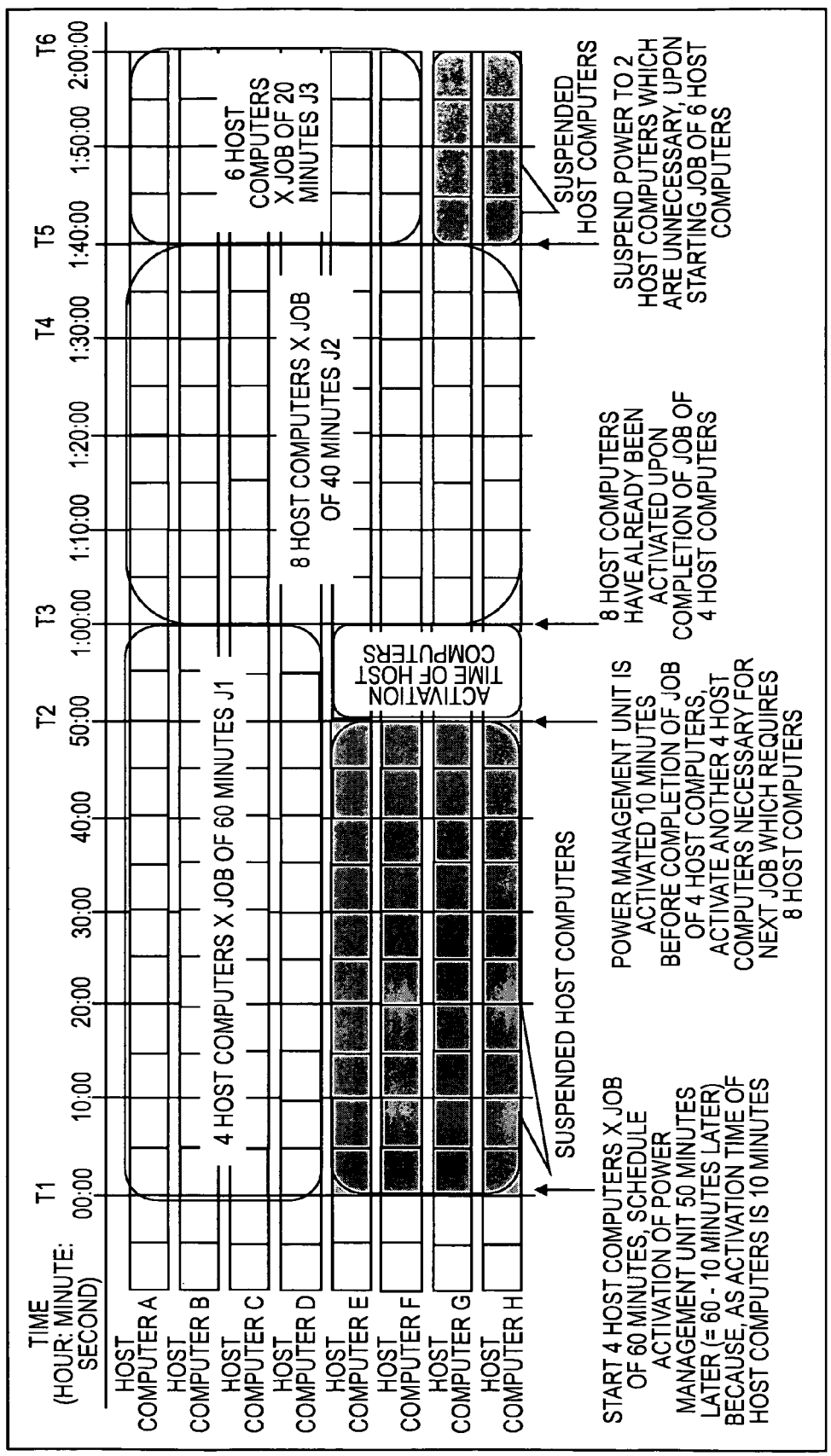
FIG. 8 is a time chart illustrating an example of power management performed by the job scheduler and the host power management unit with respect to a plurality of host computers.

Next, FIG. 8 is a time chart for illustrating an example of power management performed by the job scheduler 10 and the host power management unit 170 with respect to the plurality of host computers 4. FIG. 8 illustrates an exemplary case where eight host computers A to H are provided as the host computers 4 for executing a parallel job. In the drawing, all the host computers A to H are in the operating state at the time T1 or earlier.

First, at the time T1, a previous job is completed, and another job J1, which uses four of the host computers 4 and takes 60 minutes, is started. The job scheduling unit 120 of the job scheduler 10 executes the processing of FIG. 6. The number of nodes to be used for the job J1 to be executed next is 4 while the number of nodes which are currently in the operating state is 8, and therefore no host computer 4 is to be newly activated (S2). In order to perform power control with respect to a next job J2, the job scheduling unit 120 draws up a schedule such that the host power management unit 170 is activated at the time T2 which corresponds to a time obtained by subtracting the activation time (10 minutes) of the host computers 4 from the scheduled completion time T3 of the job J1 which is started on the time T1.

Then, at the time T3, the job scheduling unit 120 allocates the job J1 to the four host computers A to D and causes the host computers A to D to execute the job J1. Further, because it can be determined, according to the processes of S8 to S10 of FIG. 6, that it is possible to suspend four host computers E to H which are not currently used, the job scheduling unit 120 instructs the power management host computer 3 to shift those host computers E to H to the suspended state. The power management host computer 3 gives an instruction to each of the host computers E to H, and the host computers E to H are shifted to the suspended state.

At the time T2, which is obtained by subtracting the activation time of the host computers from the scheduled completion time T3 of the job currently executed, the host power management unit 170 is activated.

The host power management unit 170 executes the processing of FIG. 7 to confirm that the activation of the host power management unit 170 is scheduled in the job J1 currently executed, selects the job J2 to be executed next, and obtains the number of nodes to be used for the job J2. The job J2 requires eight nodes to perform 40 minutes of arithmetic operation. The number of nodes currently in operation is 4, and accordingly, the host power management unit 170 instructs, with reference to the node power status table 160, the power management host computer 3 to newly activate four host computers E to H.

In other words, according to this invention, prior to the completion of the job J1 which is being executed by the host computers currently in operation, the activation of the host computers E to H in the suspended state is completed, based on a differential between the number of host computers necessary for the job J2 to be executed next and the number of host computers currently in operation. Then, upon completion of the job J1, the job J2 is immediately allocated to the host computers A to H, to thereby execute the job J2 without delay. It should be noted, at this time, in order to perform power control of a job J3 to be executed next to the job J2, scheduling is performed so as to activate the host power management unit 170 at the time T4 which is obtained by subtracting the activation time (10 minutes) of the host computers from the scheduled completion time T5 of the job J2.

As described above, according to this invention, when executing the job J1, the activation of the host power management unit 170 for performing power control of the next job J2 is scheduled, and the host computers E to H necessary for starting the next job J2 are activated in advance, to thereby suppress power consumption of the entire computer system without incurring a processing performance penalty.

It should be noted that, in FIG. 8, a description is given of an exemplary case where the power consumption in the host computers A to H is reduced. However, the same applies to the I/O control devices 5 and the additional processing units 6 described above, and those devices may be activated at a time obtained by subtracting the activation time of the host computers from the scheduled completion time of the job currently executed.

FIG. 9 shows a result of comparison made in terms of power consumption, between a case where the power control according to this invention is performed with respect to the above-mentioned host computers A to H of FIG. 8 and a case where all the host computers are operated without being subjected to the power control.

When the power consumption per one host computer is 300 W/h, the power consumption in the entire system is 3.6 kwh in a case where this invention is applied to the system to bring the host computers to the suspended state. In contrast to this, in a case where the operating states of the host computers are maintained as in the conventional example, the power consumption of the entire system is 4.8 kwh. Accordingly, this invention is capable of reducing the power consumption by 1.2 kwh. In this manner, according to this invention, it is possible to achieve reduction in power consumption even in a computer system including a plurality of host computers. In particular, in a computer system, such as a super computer, which includes an enormous number of host computers 4, it is possible to significantly reduce the power consumption while maintaining processing performance (response).

Also, as described above with regard to S8 of FIG. 6, the host computers 4 which do not execute the job are basically shifted to the suspended state. However, in a case where the host computers 4 are reactivated for executing a next job shortly after being shifted to the suspended state, the host computers 4 are prohibited from being shifted to the suspended state, which makes it possible to save power necessary for activating the host computers 4, to thereby perform control to reduce power consumption in the entire computer system. At this time, the host computers 4 which do not execute the job are shifted to the low power consumption mode, to thereby suppress wasteful power consumption.

In the above-mentioned embodiment, one of the plurality of host computers 4 is provided as the job management host computer 1 and another one of the host computers is provided as the power management host computer 3. However, the job management host computer 1 and the power management host computer 3 may be integrated into one computer. Alternatively, the job scheduler 10 and a management computer for performing the power control may be provided on the network 2.

Also, the above-mentioned embodiment has been described by taking, as an example, a case of activating the host power management unit 170 for determining nodes to be newly activated based on the schedule of a job. However, this invention is not limited thereto, as long as host computers 4 to be additionally activated can be determined and activated at a time which is obtained by subtracting the activation time of the host computers 4 from the scheduled completion time of the job currently executed.

As described above, this invention can be applied to a computer system including a plurality of computers. In particular, this invention can be applied to a super computer or a parallel computer, which includes a large number of computers.

While the present invention has been described in detail and pictorially in the accompanying drawings, the present invention is not limited to such detail but covers various obvious modifications and equivalent arrangements, which fall within the purview of the appended claims.

What is claimed is:

1. A method of power-aware job management performed in a computer system which includes a plurality of host computers for managing a job to be executed by at least one of the host computers and a power supply of at least one of the host computers, the method comprising:
    receiving the job;
    storing the received job;
    scheduling an execution plan for the stored job;
    determining, based on the execution plan of the job, a timing at which to execute power control of at least one of the host computers based on a subtraction of an activation time, which is required for activating one of the host computers from a suspended state to an activated state, from a scheduled completion time of a job being executed immediately before the scheduled job;
    determining, before the timing at which to execute power control is reached, at least one of the host computers to be activated for executing the scheduled job in addition to each of the host computers that are used for the job being executed immediately before the scheduled job;
    determining, from the host computers that are used for the job being executed immediately before the scheduled job, a host computer to be shifted to the suspended state prior to the timing at which to execute power control being reached;
    controlling the power supply of the at least one of the host computers to be activated and the host computer to be shifted to the suspended state upon the timing at which to execute power control being reached; and
    executing the scheduled job.

2. The method of power-aware job management according to claim 1, wherein:
    the computer system includes a power management unit for instructing one of activation of power and shifting to a suspended state, with respect to each of the host computers; and
    controlling the power supply of the at least one of the host computers to be activated comprises giving an instruction to the power management unit.

3. The method of power-aware job management according to claim 1, wherein:
    the job comprises execution information which includes information on a number of host computers necessary for executing the job;
    determining the at least one of the host computers to be activated for executing the scheduled job comprises:
    reading, from the execution information, the number of host computers necessary for the scheduled job;
    obtaining a number of host computers that are used for the job being executed immediately before the scheduled job; and
    determining a number of host computers to be additionally activated by comparing the number of host computers necessary for the scheduled job with the number of host computers that are used for the job being executed immediately before the scheduled job; and
    determining the host computer to be shifted to the suspended state comprises determining a number of host computers to be shifted to the suspended state by comparing the number of host computers necessary for the scheduled job with the number of host computers that are used for the job being executed immediately before the scheduled job.

4. The method of power-aware job management according to claim 1, wherein:
    the job comprises execution information which includes information on arithmetic performance of host computers necessary for executing the job; and controlling the power supply of the at least one of the host computers to be activated and the host computer to be shifted to the suspended state comprises reading the information on arithmetic performance from the execution information and setting the arithmetic performance to the at least one of the host computers to be activated.

5. The method of power-aware job management according to claim 1, wherein:
the job comprises execution information which includes information on a scheduled completion time at which the execution of the job is completed; and
determining the timing at which to execute the power control comprises reading, from the execution information, the scheduled completion time, and determining the timing at which to execute the power control based on the scheduled completion time.

6. The method of power-aware job management according to claim 1, wherein:
the job comprises execution information which includes information on one of an I/O control device and an additional processing unit necessary for the job; and
controlling the power supply of the at least one of the host computers to be activated and the host computer to be shifted to the suspended state comprises reading one of the I/O control device and the additional processing unit necessary for the job from the execution information and setting, with respect to the at least one of the host computers to be activated, activation of one of the I/O control device and the additional processing unit.

7. The method of power-aware job management according to claim 1, wherein determining the host computer to be shifted to the suspended state comprises determining, based on power consumption of the computer system as a whole, one host computer of the at least one of the host computers to be activated in addition to the host computers that are used for the job being executed immediately before the scheduled job and the host computers that are used for the job being executed immediately before the scheduled job, to be shifted to a suspended state.

8. The method of power-aware job management according to claim 7, wherein determining the host computer to be shifted to the suspended state comprises prohibiting any host computer that would be shifted to the suspended state in less than a predetermined period from being the host computer to be shifted to the suspended state.

9. A computer system, comprising:
a plurality of host computers each including:
a processor for performing arithmetic processing;
a memory for storing information;
a power supply for supplying power to the processor and the memory; and
a power management unit for controlling the power supply;
a network for coupling the plurality of host computers; and
a management computer, which is coupled to the network, for allocating a job to the plurality of host computers, wherein:
the management computer comprises:
a job receiving unit for receiving the job;
a job queue for holding the received job;
a job scheduling unit for scheduling an execution plan for the job held in the job queue; and
a host power management unit for instructing a power supply state to the power management unit of each of the plurality of host computers;
the job scheduling unit comprises:
a power scheduling unit for determining, based on the execution plan of the job, a timing at which to cause the host power management unit to function based on a subtraction of an activation time, which is required for activating one of the host computers from a suspended state to an activated state, from a scheduled completion time of a job being executed immediately before the scheduled job; and
a job executing unit for allocating the scheduled job to the plurality of host computers and causing the plurality of host computers to execute the scheduled job; and
the host power management unit comprises:
a control target determining unit for determining, prior to the timing at which to cause the determined host power management unit to function being reached, at least one of the host computers to be activated for executing the scheduled job in addition to each of the host computers that are used for the job being executed immediately before the scheduled job and a host computer, from the host computers that are used for the job being executed immediately before the scheduled job, to be shifted to the suspended state; and
a power management executing unit for instructing a power supply state to the at least one of the host computers to be activated and the host computer to be shifted to the suspended state upon the timing at which to cause the host power management unit to function being reached.

10. The computer system according to claim 9, wherein:
the power management executing unit is configured to:
instruct activation with respect to the at least one of the host computers to be activated; and
instruct the suspended state with respect to the host computer to be shifted to the suspended state.

11. The computer system according to claim 9, further comprising a power management unit for instructing one of an activation of power and shifting to a suspended state, with respect to the plurality of host computers,
wherein the power management executing unit instructs a power supply state of a host computer of a control target, with respect to the power management unit.

12. The computer system according to claim 10, wherein:
the job comprises execution information which includes information on a number of host computers necessary for executing the job; and
the control target determining unit determines one of a number of the at least one of the host computers to be additionally activated and a number of host computers to be shifted to the suspended state, by comparing the number of host computers necessary for the scheduled job which is read from the execution information with a number of the host computers that are used for the job being executed immediately before the scheduled job.

13. The computer system according to claim 10, wherein:
the job comprises execution information which includes information on arithmetic performance of host computers necessary for executing the job; and
the control target determining unit reads the arithmetic performance from the execution information and sets the arithmetic performance with respect to the at least one of the host computers to be activated.

14. The computer system according to claim 9, wherein:
the job comprises execution information which includes information on a scheduled completion time at which the execution of the job is completed; and
the power scheduling unit reads, from the execution information, the scheduled completion time, and determines the timing at which to execute the power control based on the scheduled completion time.

15. The computer system according to claim 10, wherein:
the plurality of host computers each further comprises an I/O control device for storing information and an additional processing unit for executing specific arithmetic processing;
the job comprises execution information which includes information on one of an I/O control device and an additional processing unit necessary for the job; and
the power management executing unit reads, from the execution information, one of the I/O control device and the additional processing unit necessary for the job, and instructs activation of one of the I/O control device and the additional processing unit, respect to the at least one of the host computers to be activated.

* * * * *